June 18, 1963   A. PREZIOSI   3,094,348
SCOOP SHOVEL
Filed July 14, 1960
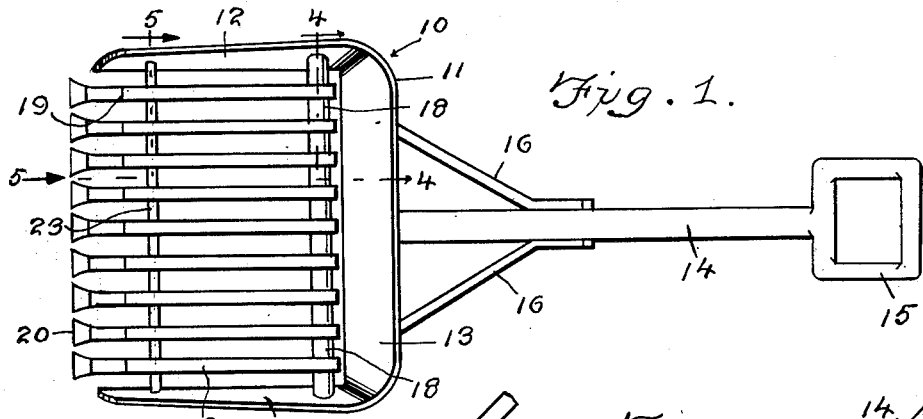
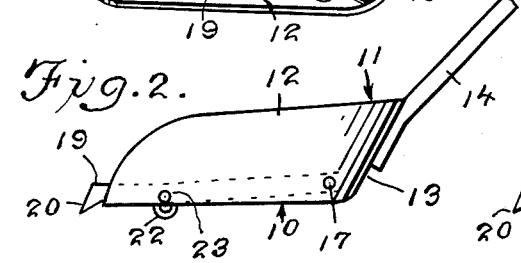
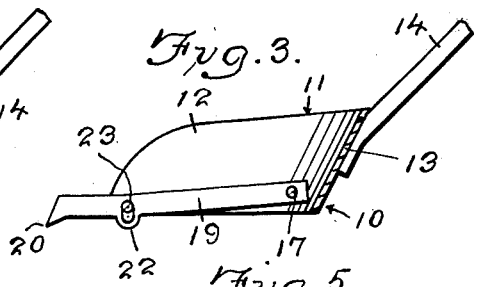
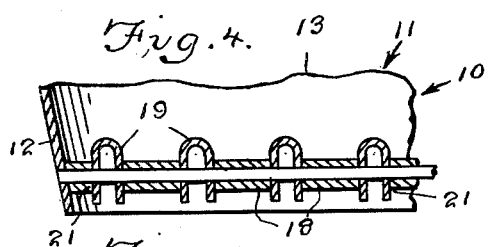
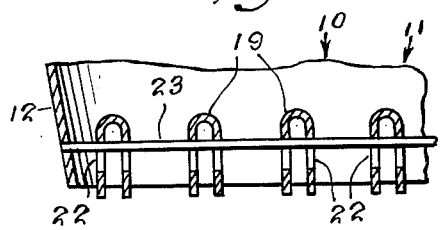
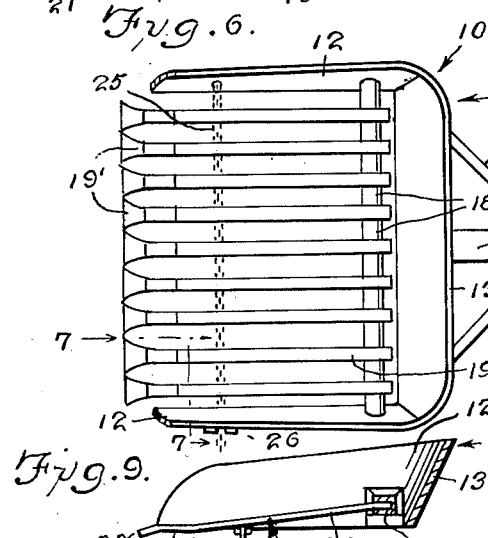
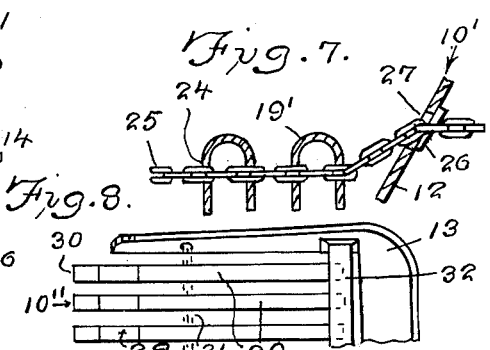
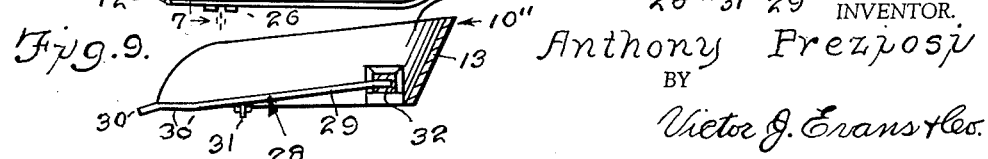
INVENTOR.
Anthony Preziosi
BY
Victor J. Evans & Co.
ATTORNEYS

United States Patent Office 3,094,348
Patented June 18, 1963

3,094,348
SCOOP SHOVEL
Anthony Preziosi, 215 Wallace St., Freeport, N.Y.
Filed July 14, 1960, Ser. No. 42,916
4 Claims. (Cl. 294—55.5)

This invention relates to a shovel, and more particularly to a shovel for scooping up leaves, debris, from lawns or the like.

The object of the invention is to provide a shovel which includes a plurality of tines that are flexibly mounted so that the shovel can be conveniently used on irregular surfaces in order to facilitate the picking up of various types of articles such as leaves, twigs, debris or the like.

Another object of the invention is to provide a shovel or scoop which is especially suitable for use by persons working around lawns or yards since leaves and the like can be readily and conveniently picked up and wherein the shovel of the present invention is constructed so that even when the shovel passes over irregular surfaces such as depressions or bumps in the ground the leaves will be effectively picked up due to the fact that there is a plurality of independently supported tines which insure that the shovel will conform to the configuration of the ground over which the device is being used.

A further object of the invention is to provide a scoop shovel which is extremely simple and inexpensive to manufacture.

Other objects and advantages will be apparent during the course of the following description.

In the accompanying drawing, forming a part of this application, and in which like numerals are used to designate like parts throughout the same:

FIGURE 1 is a top plan view of the scoop shovel constructed according to the present invention.

FIGURE 2 is a fragmentary side elevational view of the scoop shovel of the present invention.

FIGURE 3 is a fragmentary vertical sectional view illustrating the scoop shovel.

FIGURE 4 is a sectional view taken on the line 4—4 of FIGURE 1.

FIGURE 5 is a sectional view taken on the line 5—5 of FIGURE 1.

FIGURE 6 is a fragmentary plan view of the shovel illustrating a modification.

FIGURE 7 is a fragmentary sectional view taken on the line 7—7 of FIGURE 6.

FIGURE 8 is a fragmentary plan view of another modification.

FIGURE 9 is a fragmentary sectional view illustrating certain constructional details of the device of FIGURE 8.

Referring in detail to the drawings, and more particularly to FIGURES 1 through 5 of the drawings, the numeral 10 indicates a scoop shovel which includes a body member 11 having spaced parallel side walls or portions 12 each fabricated of flat sheet metal and arranged in an upwardly and outwardly sloping direction. A flat back wall or portion 13 extends perpendicularly with respect to the side portion 12 and is arranged in an upwardly and rearwardly sloping direction. The back portion 13 is formed integrally with the side portions 12 and connects the adjacent ends of the side portions 12 together. The number 14 indicates a handle which is suitably affixed to the portion such as the portion 13 of the body member 11, and the handle 14 may have a hand gripping portion 15 on its upper rear end, as for example as shown in FIGURE 1. Braces 16 help stabilize and maintain the handle 14 in its proper position.

The numeral 17 indicates a pin that extends between the rear ends of the side portions 12 and which is suitably affixed thereto, and a plurality of spacers 18 are mounted on the pin 17, FIGURE 4. There is further provided a plurality of tines 19 which each have an inverted U-shape in cross section, and the lower front ends of the tines 19 are pointed as indicated by the numeral 20. The tines 19 are arranged in parallel spaced relation and in a horizontal plane between the body member side portions 12. The tines 19 are also provided with registering apertures 21 for the projection therethrough of the pin 17, as for example as shown in FIGURE 4, so that the pin 17 provides a pivotal mounting for the tines 19.

As shown in FIGURE 5 for example, the front portions of the tines 19 are provided with slots 22, and a rod 23 extends through these registering slots 22, and the ends of the rod 23 are suitably fastened to the side portions 12 of the body member 11.

Referring now to FIGURES 6 and 7 of the drawings, there is illustrated a modified scoop shovel which is indicated generally by the numeral 10' and the scoop shovel 10' includes tines 19' which functions generally in the same manner as previously described tines 19. The tines 19 are provided with registering openings 24, and a chain 25 extends through these registering openings 24, and one end of the chain 25 may be suitably affixed to a side portion 12, or rear end portion of the chain 25 extends through a cutout or opening 27 in the opposite side portion of the body member, and a retainer 26 is adapted to extend through one of the lengths of the chain 25 in order to maintain the chain 25 in the desired position. This chain 25 serves the same basic or general purpose as the previously described rod 23.

Referring now to FIGURES 8 and 9 of the drawings, there is illustrated a further modified scoop shovel which is indicated generally by the numeral 10", and the scoop shovel 10" has a plurality of tines 28 which may be made of a suitable material such as metal, and the tines 28 include a main straight portion 29 as well as a front downwardly disposed offset portion 30, and an offset section 30' is arranged just rearwardly of the offset portion 30, and this construction of the tines serves to help prevent the tines from digging into the soil. A chain 31 extends beneath the plurality of tines 29, as for example as shown in FIGURES 8 and 9 so as to help support the tines, but nevertheless the chain permits the tines 28 to move independently so that the scoop shovel can readily move over irregular shaped surfaces in order to pick up leaves, debris and the like from the ground or other surface. The rear ends of the tines 28 are suitably fastened in a channel member or bar 32, and the bar 32 is secured as by welding to the rear end of the side portions 12.

From the foregoing, it is apparent that there has been provided a scoop shovel which is especially suitable for use in picking up leaves, debris or the like from lawns or other areas. In use, when using the scoop shovel 10 shown in FIGURES 1 through 5, and with the parts arranged as shown in the drawings, it will be seen that the portion 15 can be conveniently gripped in the hand and then the device can be moved along the lawn or along the ground and it is to be noted that the tines 19 of the lower front pointed portions 20, and in addition the tines 19 are capable of relative movement in the body member 11, and the tines 19 have their rear portions pivotally mounted on the pin 17. In addition, the tines 19 are provided with the slots 22 through which extends the rod 23 and due to the provision of the elongated slots 22, the tines 19 are free to flex or pivot on the pin 17. Thus, the plurality of tines can move independently of each other so that in the event rough terrain or uneven ground surfaces are encountered, the tines can independently move up and down in order to pick up leaves, twigs, or the like from depressions in the ground or from high points or other irregular surfaces. The spacers 18 help maintain the tines 19 in their proper spaced apart relation.

In the modification of FIGURES 6 and 7, a scoop shovel 10' functions in generally the same manner as the previously described scoop shovel 10 of FIGURES 1 through 5, except that in FIGURES 6 and 7 the numeral 19' indicates the plurality of tines which are pivotally supported on a pin such as the pin 17, and spacers 18 are interposed between rear ends of the tines 19'. However, in FIGURES 6 and 7 a chain 25 has one end fastened to a side portion 12, and the chain 25 extends beneath the plurality of tines 19' so as to support these tines 19' in such a manner that they can flex as they engage or move over objects and uneven ground surfaces. The other end portions of the chain 25 extends through a suitable opening 27 in the side wall portion 12, and a retainer 26 is adapted to engage only the links of the chain 25. Thus, when desired the retainer 26 can be disengaged from the links of the chain 25 in order to vary the tension on the chain 25, so that the position of support of the tines can be controlled or regulated as desired.

In the modification of FIGURES 8 and 9, the scoop shovel 10" includes a plurality of tines 28 which may be made of a suitable material such as thin sheet metal, and the rear ends of the tines 28 are rigidly fastened in a beam or bar 32 which may be secured as by welding to the side portions 12, and the tines 28 are loosely supported on a chain such as the chain 31 so that for example when the offset front end portion 30 of the tines 28 engage uneven ground surfaces, the chain 31 permits the tines to flex or move slightly in order to efficiently pick up twigs, debris, leaves or the like which may be on the lawn or other area.

The parts can be made of any suitable material and in different shapes or sizes.

Different types of mountings can be provided or utilized for the tines. For example as shown in FIGURES 1 through 5 the rod 23 extends through the slots 22 in the tines 19, while in FIGURES 6 and 7 the chain 25 takes the place of the rod 23, and the chain 25 may extend through openings such as the openings 24 in the tines 19'. Or, as shown in FIGURES 8 and 9 the chain 31 can be used in lieu of or instead of the chain 25 and instead of the rod 23, and the chain 31 extends beneath or below the tines 28.

Thus, the tines are mounted or arranged so that the tines can move as desired, and the front of the tines are adapted to be shaped so that they will not dig into the ground or soil. By means of the members such as the members 26, the tension of slack of the chain such as the chain 25 can be adjusted as for example according to the contour of the ground. Thus, with the present invention a large capacity can be provided and in addition leaves and the like will be picked up with a shoveling or pushing motion and it will not be necessary to rake the leaves into baskets or the like which then have to be emptied since with the lawn shovel or scoop of the present invention the leaves or other material will be readily picked up and can be more conveniently emptied. It can be used in tall grass or wet grass and it can also be used in other locations such as around flower beds and since the tines are spaced from each other, small particles such as dirt or soil will pass downwardly between the tines so that the soil will be released. The device can be made of light weight material and is adapted to have a large capacity and is especially suitable for use by home owners. Due to the provision of the sloping side portions 12 and the back portion 13, material which is picked up will not accidently fall out of the device. The device can be used for picking up large quantities of leaves, debris or the like and wherein such material can then be readily dumped on a pile of debris or the like, and the tines are arranged in spaced parallel relation with respect to each other so as to facilitate the movement of the device through the grass of a lawn. Each tine is capable of independent movement, and the provision of the rods and plus or chains function as guides so as to prevent the tines from moving too far out of their regular position. The tines may have turned up edges on their front ends so as to avoid digging into the ground. The device can be made of light weight material such as aluminum, magnesium or the like and the tines may be stamped out of a suitable material such as a suitable metal. Instead of making the spacers 18 in separate pieces, they may be formed integral with the tines.

Minor changes in shape, size and rearrangement of details coming within the field of invention claimed may be resorted to in actual practice if desired.

What is claimed is:

1. A scoop shovel comprising a body member having a pair of spaced parallel flat side portions each arranged in an upwardly and outwardly sloping direction and a flat back portion arranged in an upwardly and rearwardly sloping direction, said back portion connecting the adjacent ends of said side portions together, a handle having one end secured to said body member back portion, a plurality of spaced parallel tines arranged in a horizontal plane between said body member side portions adjacent the lower ends of the latter, each of said tines having an inverted U-shaped cross sectional configuration, means connecting the end portions of said tines adjacent said body member back portion to the adjacent parts of said body member side portions, and other means loosely connecting the end portions of said tines remote from said body member back portion to the adjacent parts of said body member side portions.

2. A scoop shovel comprising a body member having a pair of spaced parallel flat side portions each arranged in an upwardly and outwardly sloping direction and a flat back portion arranged in an upwardly and rearwardly sloping direction, said back portion connecting the adjacent ends of said side portions together, a handle having one end secured to said body member back portion, a plurality of spaced parallel tines arranged in a horizontal plane between said body member side portions adjacent the lower ends of the latter, each of said tines having an inverted U-shaped cross sectional configuration, means connecting the end portions of said tines adjacent said body member back portion to the adjacent parts of said body member side portions, and other means embodying a chain loosely connecting the end portions of said tines remote from said body member back portion to the adjacent parts of said body member side portions.

3. A scoop shovel comprising a body member having a pair of spaced parallel flat side portions each arranged in an upwardly and outwardly sloping direction and a flat back portion arranged in an upwardly and rearwardly sloping direction, said back portion being formed integrally with said side portions, a handle having one end secured to said body member back portion, a plurality of spaced parallel tines arranged in a horizontal plane between said body member side portions adjacent the lower ends of the latter, each of said tines having an inverted U-shaped cross sectional configuration, means fixedly securing the end portions of said tines adjacent said body member back portion to the adjacent parts of said body member side portions, and other means loosely connecting the end portions of said tines remote from said body member back portion to the adjacent parts of said body member side portions.

4. A scoop shovel comprising a body member having a pair of spaced parallel flat side portions each arranged in an upwardly and outwardly sloping direction and a flat back portion arranged in an upwardly and rearwardly sloping direction, said back portion being formed integrally with said side portions, a handle having one end secured to said body member back portion, a plurality of spaced parallel tines arranged in a horizontal plane between said body member side portions adjacent the lower ends of the latter, each of said tines having an inverted U-shaped cross sectional configuration, means fixedly securing the end portions of said tines adjacent said body member back portion to the adjacent parts of said body member side portions, and other means embodying a chain loosely connecting the end portions of said tines remote from said body member back portion to the adjacent parts of said body member side portions.

References Cited in the file of this patent

UNITED STATES PATENTS

| | | |
|---|---|---|
| 102,598 | Sharp | May 3, 1870 |
| 209,058 | Kretsinger | Oct. 15, 1878 |
| 226,351 | Reddick | Apr. 6, 1880 |
| 624,661 | Lay | May 9, 1899 |
| 716,045 | Huske | Dec. 16, 1902 |
| 2,315,021 | Schmidt et al. | Mar. 30, 1943 |
| 2,463,393 | Key | Mar. 1, 1949 |

FOREIGN PATENTS

| | | |
|---|---|---|
| 13,039 | Denmark | Feb. 26, 1910 |
| 617,456 | Germany | Aug. 19, 1935 |